UNITED STATES PATENT OFFICE.

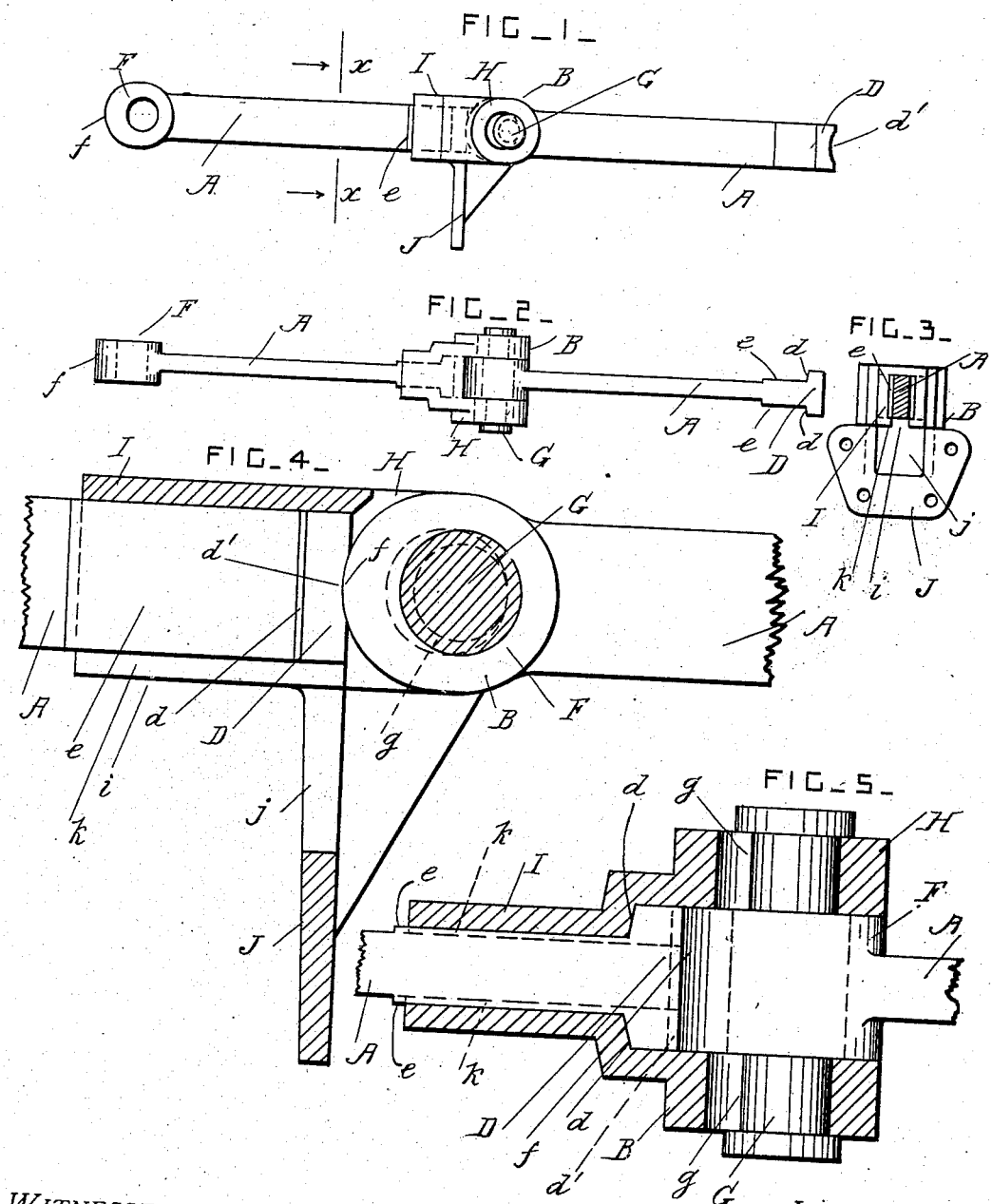

JESMOND TAYLOR NICHOLSON, OF WILKES-BARRE, PENNSYLVANIA.

DRIVE-CHAIN.

No. 840,240.  Specification of Letters Patent.  Patented Jan. 1, 1907.

Application filed April 20, 1906. Serial No. 312,825.

*To all whom it may concern:*

Be it known that I, JESMOND TAYLOR NICHOLSON, a citizen of the United States, residing at Wilkes-Barre, in the county of Luzerne and State of Pennsylvania, have invented certain new and useful Improvements in Drive-Chains; and I do hereby declare the following to be a full, clear, and exact description of the invention, such as will enable others skilled in the art to which it appertains to make and use the same.

This invention relates to drive-chains specially intended for use in coal elevators and conveyers; and it consists in the novel construction and combination of the parts hereinafter fully described and claimed.

In the drawings, Figure 1 is a side view of a portion of the chain. Fig. 2 is a plan view of the same. Fig. 3 is a cross-section taken on the line $x\,x$ in Fig. 1. Fig. 4 is a side view of the meeting end portions of two links, showing the coupling-piece in section and drawn to a larger scale. Fig. 5 is a plan view of the parts shown in Fig. 4 and also showing the coupling-piece in section.

The chain consists of a series of single-bar links A, which are all alike and which are connected together by means of coupling-pieces B and pins G. Each link A has at one end a head D, which preferably forms two laterally-projecting shoulders $d$, one upon each side of the link. The bar is a little thicker close behind the head, so that facings $e$ are formed upon it. The head D has a recess $d'$ in its end. At its other end each link A has an eye F, having an eccentric projection $f$ on its end, and this projection is arranged to fit into the recess $d'$ in the end of the head of the next adjacent bar when the said bars or links are in their normal position in line with each other.

G is the pin which engages with the eye F and which is provided with circumferential grooves $g$ at its end portions.

The coupling-pieces B are provided with double-eyes H, having holes large enough for the pins G to pass through, and the eyes of the double-eyes are of a width suitable for engaging with the grooves $g$ of the said pins. Each coupling-piece has also a socket I for the head and end portion of the link to engage with. This socket is open upon one side $i$, which is preferably its lower side, to that the shoulders of the head may be slipped upwardly into engagement with the said socket.

J is a plate which is formed upon or secured to the coupling-piece for engaging the coal in the conveyer-trough or for the attachment of a larger plate or blade for engaging with the coal. This plate is preferably formed on the under side of the coupling-piece, so that it also forms a brace for it, and it is provided with an opening $j$, which permits the head of the link to be slipped into the socket.

After the link-head has been placed in engagement with the socket of the coupling-piece the eye of the next link is placed between the eyes of the double-eye, and the coupling-pin is inserted through the holes in the eyes while the links are out of line with each other and not in their normal positions. The pin can only be inserted and removed when one link is placed at an angle to the other. After the pin is inserted in the eyes the links are placed in line with each other, and the eccentric projection on the eye of one link thereupon engages with the recess in the head of the other link, so that the said head is prevented from dropping out of the socket of the coupling-piece. The grooves of the pin are also moved into engagement with the holes of the double-eye, as shown in Fig. 5, so that the pin is prevented from sliding endwise. A very free pivotal connection is thus formed between the links, which cannot become disconnected accidentally, and the links can easily be separated whenever required. The chain is very simple and economical to construct on account of the fewness and simplicity of its parts, and it does not carry with it any substances, such as coal or rock, into the sprocket-wheels. The chain and its sprocket-wheels are therefore less liable to be injured or broken when the chain is constructed as hereinbefore described.

The socket I is preferably provided with a lug or lugs $k$ at the bottom edges of its opening $i$. The lateral projections or facings $e$ rest upon these lugs, so that the bar is held in operative connection with the socket independent of the projection $f$ and recess $d'$. The projection $f$ and recess $d'$ are necessary to hold the centers of the pivot-pins at the exact distance apart as prearranged, and they would prevent the link from dropping; but the lugs $k$ make it impossible for the link to drop. The thinner part of the link behind the facings $e$ is slid between the lugs $k$, and the link is then drawn back, so that the head D engages with the socket.

What I claim is—

1. The combination, with a link provided with a head, and a link provided with an eye; of a coupling-piece provided with a socket for the said head and having also a double-eye, and a pin pivotally connecting the said eye and double-eye.

2. The combination, with a link provided with a head, and a link provided with an eye which is articulated with the said head; of a coupling-piece provided with a socket having an opening on one side to admit the said head and having also a double-eye, and a pin connecting the said eye and double-eye.

3. The combination, with a link provided with a head, and a link provided with an eye; of a coupling-piece provided with a socket for the said head and a double-eye, and a pin connecting the said eye and double-eye and provided with means which prevent it from sliding crosswise of the said coupling-piece when the holes of the said eyes are out of line with each other.

4. The combination, with a link provided with a head, and a link provided with an eye the end of which is articulated with the end of the said head; of a coupling-piece provided with a socket for the said head and having also a double-eye, and a pin which connects the said eye and double-eye and which normally holds the said head and eye in operative relation.

5. The combination, with a link provided with a head, and a link provided with an eye which is articulated with the said head; of a coupling-piece provided with a socket for the said head and having also a double-eye, and a pin engaging with the said eye and provided with reduced portions which are slidable longitudinally of the said coupling-piece in its said double-eye.

6. The combination, with a link provided with a head having a recess in its end, and a link provided with an eye having an eccentric projection at its end which engages pivotally with the said recess; of a coupling-piece provided with a socket for the said head and having also a double-eye, and means for pivotally connecting the said eye and double-eye and holding the said projection and recess in operative relation.

7. The combination, with a link provided with a head and a lateral projection behind the head, and a link provided with an eye; of a coupling-piece provided with a socket having an opening on one side and a lug at the bottom of the said opening so as to admit the said head and support it in the socket and having also a double-eye, and a pin connecting the said eye and double-eye.

In testimony whereof I have affixed my signature in the presence of two witnesses.

JESMOND TAYLOR NICHOLSON.

Witnesses:
J. M. GREGORY,
ERNEST D. RINEHIMER.